US007721421B2

(12) United States Patent
Matsuoka

(10) Patent No.: US 7,721,421 B2
(45) Date of Patent: May 25, 2010

(54) WIRE SETTING DEVICE

(75) Inventor: Masaki Matsuoka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 579 days.

(21) Appl. No.: 11/656,388

(22) Filed: Jan. 23, 2007

(65) Prior Publication Data

US 2007/0169339 A1 Jul. 26, 2007

(30) Foreign Application Priority Data

Jan. 25, 2006 (JP) .......................... P.2006-016649

(51) Int. Cl.
*B23P 19/00* (2006.01)
*H01R 43/00* (2006.01)

(52) U.S. Cl. ............................ 29/748; 29/707; 29/714; 29/721; 29/759; 340/686.1

(58) Field of Classification Search .................. 29/707, 29/714, 720, 721, 747, 748, 759, 33 F, 825; 340/686.1
See application file for complete search history.

(56) References Cited

U.S. PATENT DOCUMENTS 5,522,130 A * 6/1996 Wollermann ................ 29/825
5,596,802 A * 1/1997 Koch et al. .................... 29/748
6,243,947 B1 * 6/2001 Fujita et al. ................ 29/33 F

FOREIGN PATENT DOCUMENTS

| | | |
|---|---|---|
| JP | 59-123413 | 7/1984 |
| JP | 8-138825 | 5/1996 |
| JP | 9-17253 | 1/1997 |
| JP | 2000-102133 | 4/2000 |
| JP | 2001-60433 | 3/2001 |
| JP | 2001-357960 | 12/2001 |

OTHER PUBLICATIONS

Office Action issued on Apr. 7, 2009 in corresponding Japanese patent application No. 2006-016649.

* cited by examiner

*Primary Examiner*—Donghai D. Nguyen
(74) *Attorney, Agent, or Firm*—Kratz, Quintos & Hanson, LLP

(57) ABSTRACT

A wire setting device includes a first optical detecting portion that detects a setting of the wire in a groove based on a first light beam passing across the wire insertion groove, a second optical detecting portion that detects abutting contact of the distal end of the wire with a proper point on a wire abutment surface based on a second light beam in a direction intersecting the wire, a wire clamp between, and a control portion that determines that the wire is properly positioned in the wire insertion groove based on detection signals from the first and second optical detecting portions, and controls the wire clamp.

4 Claims, 2 Drawing Sheets

WIRE SETTING DEVICE

BACKGROUND OF THE INVENTION

This invention relates to a wire setting device for a wire end processing apparatus, which can set a wire in a proper position for an end processing, and can clamp the wire in this condition.

In the case of applying an end processing to a wire (or cable) comprising, for example, a core wire (center conductor), an inner sheath (inner layer) covering the conductor, a braid (shielding member) covering the inner sheath, and an outer sheath (outer covering) covering the braid, first, the outer sheath is peeled or removed over a predetermined length to expose the braid, and then the exposed braid is turned back on the outer sheath, and then the exposed inner sheath is peeled or removed to expose the conductor. Thus, these steps are carried out in this order. In the case of carrying out these steps in an automated manner, first, it is necessary to accurately set the distal end of the wire in a processing position.

There is known a first related apparatus for setting a distal end of a wire in a processing position, in which the distal end of the wire is brought into abutting engagement with an abutment member, and in this condition, after confirming with the eyes that the wire is properly positioned, a wire clamp is activated by operating a manual switch (foot switch), thereby holding the wire in this position (see, for example, JP-A-2000-102133 (FIG. 5, not shown here).

Also, there is known a second related apparatus for setting a distal end of a wire in a processing position, in which a proximity switch is located in a direction of extension of a wire setting position, and the distal end of the wire is brought into abutting engagement with this proximity switch, thereby positioning the shielded wire, and also a wire clamp is operated by a signal outputted from the proximity switch at this time, thereby holding wire in its positioned condition (see, for example, JP-A-2001-357960 (FIG. 3, not shown here).

However, in the first related art, the distal end of the wire is held against the abutment member, and merely by confirming this condition with the eyes, it is judged that the positioning is completed. Therefore, in some cases, improper abutting engagement, such as oblique abutting engagement of the wire distal end with the abutment member, can not be found, and in such a case the wire can not be properly clamped, which has led to a possibility that defective processing may take place.

In the second related art, the proximity switch is located in the direction of extension of the wire setting position, and therefore in the case where a sufficient space is not available in the direction of extension of the wire setting position, it is difficult to use this related art. And besides, a pressing force is required for turning on the proximity switch, and therefore although there is no problem with a thick wire, there is a possibility that a thin wire is bent at its intermediate portion. Therefore, if the wire is bent at its intermediate portion, an unstable clamping operation is effected, which leads to a possibility that defective processing may take place.

SUMMARY OF THE INVENTION

This invention has been made in view of the above circumstances, and an object of the invention is to provide a wire setting device in a wire end processing apparatus, which can clamp a wire while it is properly positioned, and the risk of defective processing can be eliminated.

The above object has been achieved by a wire setting device of the present invention in a wire end processing apparatus which has features recited in the following Paragraphs (1) to (3).

(1) A wire setting device for a wire end processing apparatus, comprising:

a wire setting portion that includes a wire insertion groove in which an intermediate portion of a wire in a longitudinal direction thereof is set;

a first optical detecting portion that detects a property setting of the wire in the wire insertion groove based on a reception signal relating to a first light beam passing across the wire insertion groove;

a positioning portion that positions the wire in the longitudinal direction by bringing a distal end of the wire into abutting contact with the positioning portion;

a second optical detecting portion that detects an abutting contact of the distal end of the wire with a proper point on a wire abutment surface of the positioning portion based on a reception signal relating to a second light beam which is irradiated in a direction intersecting the wire, and passes through the proper point;

a wire clamp portion that is provided between the wire setting portion and the positioning portion; and a control portion that determines that the wire is properly positioned in the wire insertion groove of the wire setting portion based on detection signals from both of the first and second optical detecting portions, and controls to perform a clamping operation of the wire clamp portion.

(2) The wire setting device according to the above Paragraph (1), further comprising a slit portion that has a slit for reducing a cross-section of the second light beam, and is disposed on an optical path of the second light beam, wherein the slit portion is located at a position ahead of the proper point in a direction of advancing of the second light beam.

(3) The wire setting device according to the above Paragraph (1), wherein the second light beam is a laser beam.

In the wire setting device of the construction of the above Paragraph (1), the first optical detection device and the second optical detection device simultaneously monitor the set condition of the wire at the intermediate portion and the distal end of the wire, and therefore an improperly-set condition of the wire (as when the wire obliquely abuts against the positioning portion or abuts against it in a bent condition) can be checked beforehand, and the wire can be clamped in the proper position in a stable condition. Particularly in the wire setting device of the construction of the above Paragraph (1), the clamping of the wire is effected only when the wire distal end is brought into abutting contact with the proper point on the wire abutment surface of the positioning portion, and therefore the distal end can be accurately positioned. Therefore, in the wire setting device of the construction of the above Paragraph (1), the defective end processing can be prevented, and the yield can be enhanced, thus contributing to the conservation of resources. And besides, in the wire setting device of the construction of the above Paragraph (1), the position of the wire distal end is checked by the beam irradiated in the direction intersecting the wire, and therefore a light-emitting portion and a light-receiving portion merely need to be located on a line intersecting the wire, and almost any additional space does not need to be utilized in the direction of extension of the wire except a space for the positioning plate. Therefore, the wire setting device of the construction of the above Paragraph (1) is advantageous when achieving a layout in which a space is not available in the direction of extension of the wire.

In the wire setting device of the construction of the above Paragraph (2), the light beam reduced in cross-section by the slit is caused to pass through the proper point, and therefore the detection precision can be enhanced.

In the wire setting device of the construction of the above Paragraph (3), the laser beam with high linearity is used, and therefore the detection precision can be further enhanced.

In the present invention, the wire can be clamped while it is properly positioned, and the risk of defective processing can be eliminated.

The present invention has been briefly described above. Details of the invention will become more manifest upon reading the following Section "DETAILED DESCRIPTION OF THE PREFERRED EMBODIMENTS" with reference to the accompanying drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of the present invention will now be described with reference to the drawings.

Figure 1:
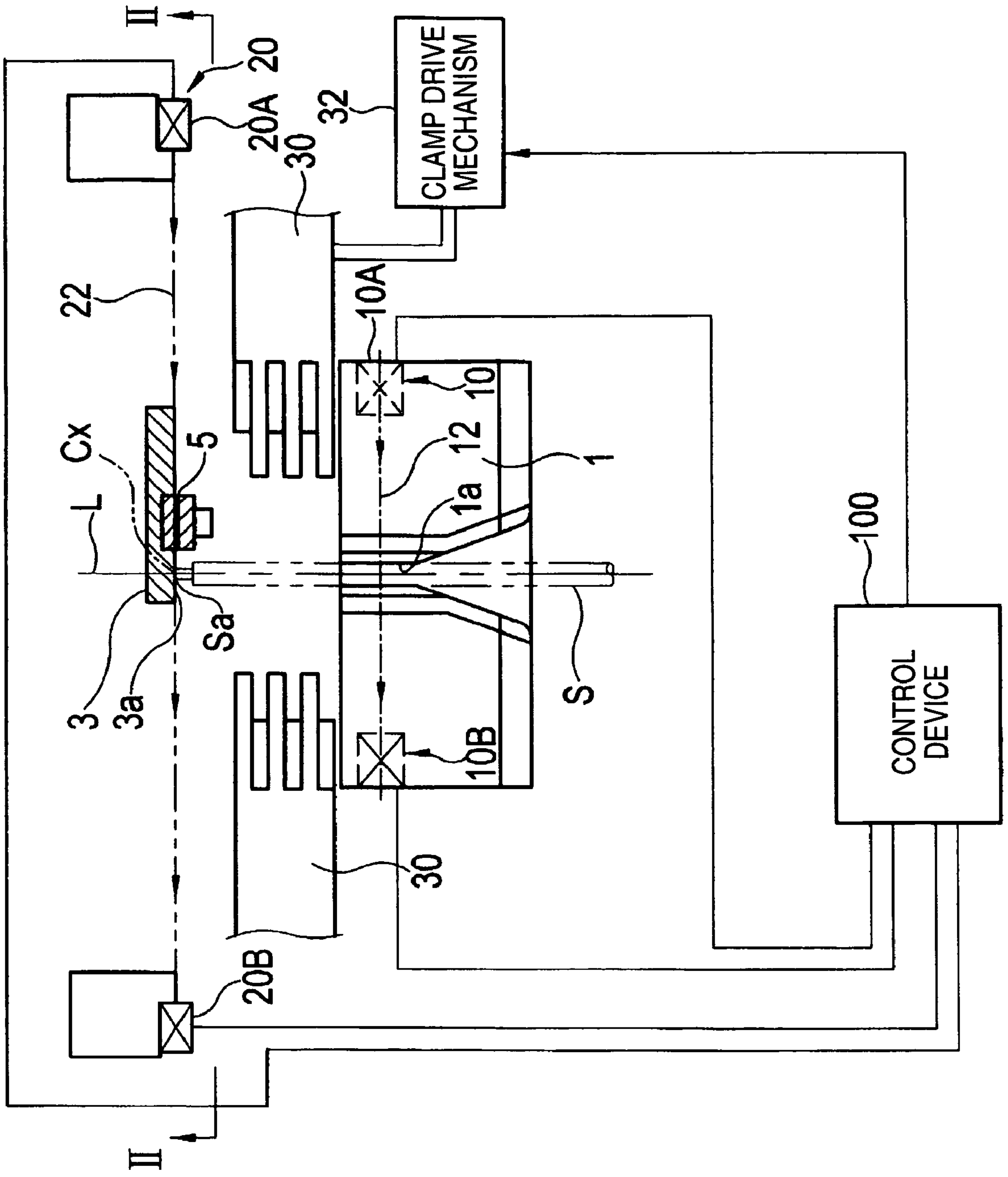
FIG. 1 is a plan view showing a broad construction of a preferred embodiment of a wire setting device of the present invention.
Figure 2:
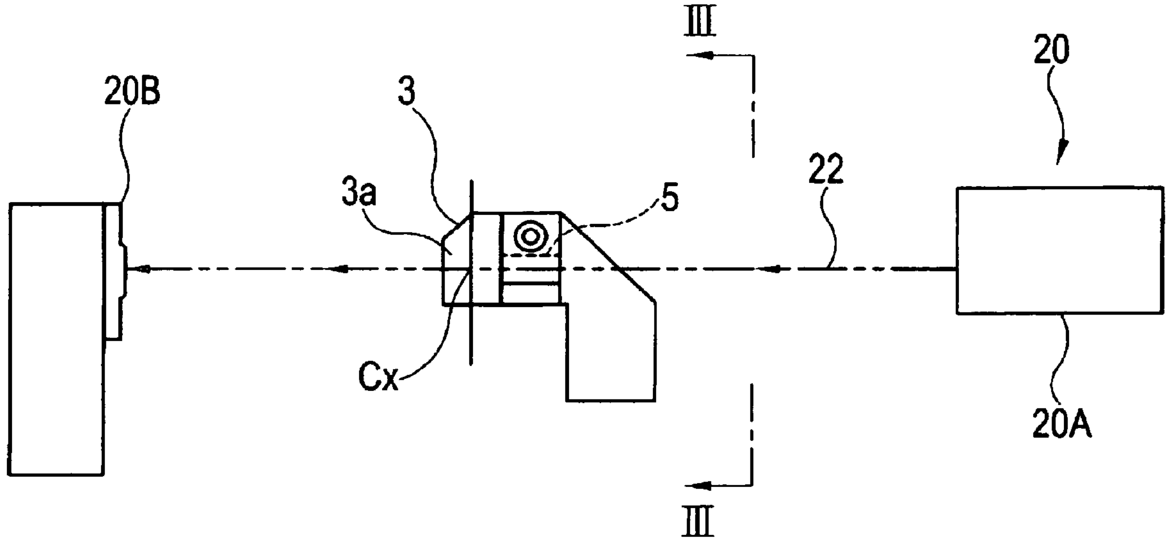
FIG. 2 is a view as seen from a direction of the line II-II of FIG. 1.
Figure 3:
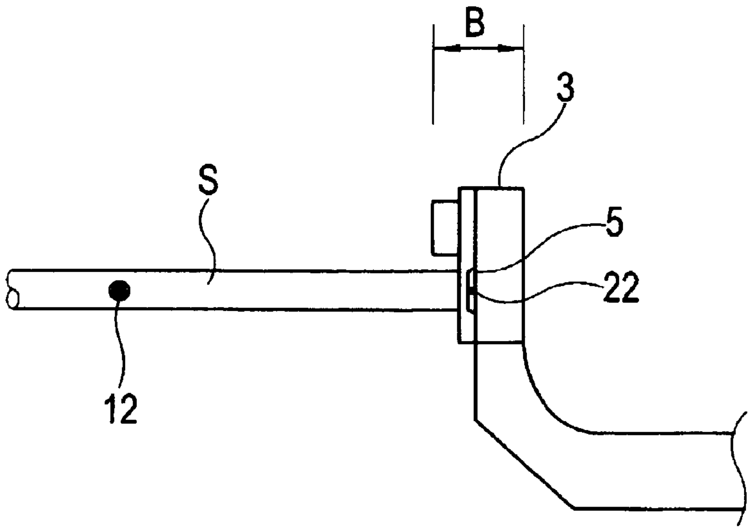
FIG. 3 is a view as seen from a direction of the line III-III of FIG. 2.

FIG. 1 is a plan view showing a broad construction of a wire setting device used in a wire end processing apparatus, FIG. 2 is a view as seen from a direction of the line II-II of FIG. 1, and FIG. 3 is a view as seen from a direction of the line III-III of FIG. 2.

This wire setting device includes a wire setting bed 1 having a wire insertion groove 1*a* in which a longitudinally-intermediate portion of a wire S (here, a shielded wire) being subjected to an end processing is set (or inserted) with a distal end Sa of the wire S directed forward, a first optical wire-detection device 10 for detecting the proper setting (insertion) of the wire S in the wire insertion groove 1*a* on the basis of a light reception signal of a beam 12 passing across the wire insertion groove 1*a*, a positioning member 3 which is located forwardly of the wire setting bed 1, and positions the wire S in the longitudinal direction when the wire distal end Sa is brought into abutting engagement with the positioning member 3, a second optical wire-detection device 20 for detecting the abutting engagement of the wire distal end Sa against a proper point Cx on a wire abutment surface 3*a* of the positioning member 3 on the basis of a light reception signal of a beam 22 which is irradiated in a direction intersecting the wire S, and passes through the proper point Cx, a wire clamp 30 located between the wire setting bed 1 and the positioning member 3, and a control device 100 which causes the wire clamp 30 to effect a clamping operation when both of the first and second optical wire-detection devices 10 and 20 output respective detection signals, judging that the wire S has been properly positioned.

The wire clamp 30 includes, for example, two gripping members which are opened and closed by a clamp drive mechanism 32 such as a pneumatic cylinder. The wire clamp 30, when closed, clamps the wire S, and also the wire clamp 30, when opened, cancels the clamping operation. The proper point Cx on the wire abutment surface 3*a* of the positioning member 3 is defined by a point of intersection of a wire setting centerline L (defined on the wire setting bed 1) with the wire abutment surface 3*a* of the positioning member 3. When the wire S is clamped by the wire clamp 30, this positioning member 3 is retracted to an appropriate place. Further, various processing units (not shown) for effecting the end processing are provided around the clamped wire, on a line of extension of the clamped and in other positions.

The first optical wire-detection device 10 includes, for example, a photoelectric sensor, and more specifically includes a light-emitting portion 10A disposed at one side of the wire insertion groove 1*a*, and a light-receiving portion 10B which is disposed at the other side of the wire insertion groove 1*a* so as to receive the beam 12 emitted from the light-emitting portion 10A.

The second optical wire-detection device 20 uses a laser beam as the inspection beam 22, and includes a light-emitting portion 20A disposed at one side of the wire setting centerline L, and a light-receiving portion 20B which is disposed at the other side of the centerline L so as to receive the beam 22 emitted from the light-emitting portion 20A, the two portions 20A and 20B being disposed on a line intersecting the wire setting centerline L in a right-left direction. In this case, a slit 5 for reducing the cross-section of the beam 22 which is to pass through the proper point Cx is provided on the positioning member 3, and is disposed at a position short of the proper point Cx (that is, the slit 5 is disposed on an optical path of the beam 22, and is located rearwardly of the proper point Cx in the direction of advancing of the beam 22). FIG. 3 shows that the slit 5 is located at a position immediately ahead of the proper point Cx.

The light-emitting portion 10A and light-receiving portion 10B of the first optical wire-detection device 10, as well as the light-emitting portion 20A and light-receiving portion 20B of the second optical wire-detection device 20, are connected to the control device 100, and the clamp drive mechanism 32 is operated in response to a drive control signal from the control device 100. The control device 100 has the function of outputting light-emitting drive signals respectively to the light-emitting portions 10A and 20A, a first judgment function of judging in response to a light reception signal from the light-receiving portion 10B that the wire S has been properly set (or inserted) in the wire insertion groove 1*a*, a second judgment function of judging in response to a light reception signal from the light-receiving portion 20A that the distal end Sa of the wire has been properly located at the proper point Cx on the positioning member 3, a third judgment function of judging that the set condition of the wire S is proper when both of the first and second judgment functions output respective judgment signals, and the function of outputting a drive control signal to the clamp drive mechanism 32 in accordance with a judgment result of the third judgment function.

Next, the operation will be described.

For properly setting the wire S by this wire setting device, the wire S is inserted into the wire insertion groove 1*a*in the wire setting bed 1, and the distal end Sa of the wire is brought into abutting engagement with the wire abutment surface 3*a* of the positioning member 3. When the wire S is set in the proper position in the wire insertion groove 1*a*, the beam 12 emitted from the light-emitting portion 10A of the first optical wire-detection device 10 is intercepted by the wire S, so that the amount of the light received by the light-receiving portion 10B varies, and as a result the first judgment function within the control device 100 produces the judgment signal. Also, when the distal end Sa of the wire is brought into abutting engagement with the proper point Cx on the wire abutment surface 3*a* of the positioning member 3, the beam 22, emitted from the light-emitting portion 20A of the second optical wire-detection device 20 and reduced in cross-section by the slit 5, is intercepted by the wire distal end Sa, so that the amount of the light received by the light-receiving portion 20B varies, and as a result the second judgment function within the control device 100 produces the judgment signal. When both of the judgments are effected simultaneously, the third judgment function judges that the set condition of the wire S is proper, so that the drive control signal is fed to the clamp drive mechanism 32, and as a result the wire clamp 30 is operated in the closing direction to hold the wire S.

Thus, the first optical wire-detection device 10 and the second optical wire-detection device 20 simultaneously monitor the set condition of the wire S at the intermediate portion and the distal end Sa of the wire S, and therefore an improperly-set condition of the wire (as when the wire obliquely abuts against the positioning member 3 or abuts against it in a bent condition) can be checked beforehand, and the wire S can be clamped in the proper position in a stable condition.

Particularly, the clamping of the wire S is effected only when the wire distal end Sa is brought into abutting engagement with the proper point Cx on the wire abutment surface 3*a* of the positioning member 3, and therefore the distal end Sa can be accurately positioned. Therefore, the defective end processing can be prevented, and the yield can be enhanced, thus contributing to the conservation of resources.

And besides, the position of the wire distal end Sa is checked by the beam 22 irradiated in the direction intersecting the wire S, and therefore the light-emitting portion 20A and the light-receiving portion 20B merely need to be located on a line intersecting the wire S, and almost any additional space does not need to be utilized in the direction of extension of the wire S except a space for the positioning plate 3. Namely, it is only necessary to secure the space for the positioning plate 3. Therefore, this is advantageous when achieving a layout in which a space is not available in the direction of extension of the wire S.

Furthermore, in the wire setting device of this embodiment, the beam 22 reduced in cross-section by the slit 5 is caused to pass through the proper point Cx, and therefore the detection precision can be enhanced. And besides, a laser beam with high linearity is used as this beam, and therefore the detection precision can be further enhanced.

The arrangement of the light-emitting portion 10A and the light-receiving portion 10B in the illustrated embodiment may be reversed, and similarly the arrangement of the light-emitting portion 20A and the light-receiving portion 20B may be reversed.

The invention is not limited to the above embodiment, and suitable modifications, improvements, etc., can be made. Furthermore, the shape, dimensions, numerical value, form, number, disposition, etc., of each of the constituent elements of the above embodiment are arbitrary, and are not limited in so far as the invention can be achieved.

For example, although the wire setting device of this embodiment employs the laser beam, an optical fiber sensor having an optical fiber connected to a light source (which may be one for emitting a laser beam) of a photoelectric sensor may be used instead of the laser beam. Particularly, this optical fiber sensor has an advantage that it can be easily mounted in a gap or a small space in a machine since its optical fiber is flexible. And besides, a distal end of a sensor head of the optical fiber of the optical fiber sensor is formed into a very small size, and even a microscopic object can be easily detected. Examples of the optical fiber described here include the commonly-used parallel-type employing two plastics fibers, the coaxial-type which is divided into a central portion (light-emitting portion) and an outer peripheral portion (light-receiving portion), and has high precision such that an operating position is not change even when a detection body passes through it in any direction, and the split-type which includes a number of glass fibers with a diameter of several tens of μm, and is divided into a light-emitting portion and a light-receiving portion.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-016649 filed on Jan. 25, 2006, the contents of which are incorporated herein for reference.

What is claimed is:

1. A wire setting device, comprising:

a wire setting bed that includes a wire insertion groove in which an intermediate portion of a wire in a longitudinal direction thereof is set;

a first optical detecting device that detects a setting of the wire in the wire insertion groove based on a reception signal relating to a first light beam passing across the wire insertion groove;

a positioning member that positions the wire in the longitudinal direction thereof by bringing a distal end of the wire into abutting contact with a proper point on a wire abutment surface of the positioning member;

a second optical detecting device that is separated from the first optical detecting device in the longitudinal direction of the wire, and that detects an abutting contact of the distal end of the wire with the proper point based on a reception signal relating to a second light beam which is irradiated in a direction intersecting the wire, and passes through the proper point;

a wire clamp that is provided between the wire setting bed and the positioning member to clamp the wire; and a control device that determines that the wire is properly positioned in the wire insertion groove of the wire setting bed based on detection signals from both of the first and second optical detecting devices, and controls to perform a clamping operation of the wire clamp.

2. The wire setting device according to claim 1, further comprising a slit for reducing a cross-section of the second light beam, and is disposed on an optical path of the second light beam, wherein the slit is located at a position ahead of the proper point in a direction of advancing of the second light beam.

3. The wire setting device according to claim 1, wherein the second light beam is a laser beam.

4. The wire setting device according to claim 2, wherein the slit is located at a position immediately ahead of the proper point in the direction of advancing of the second light beam.

* * * * *